UNITED STATES PATENT OFFICE.

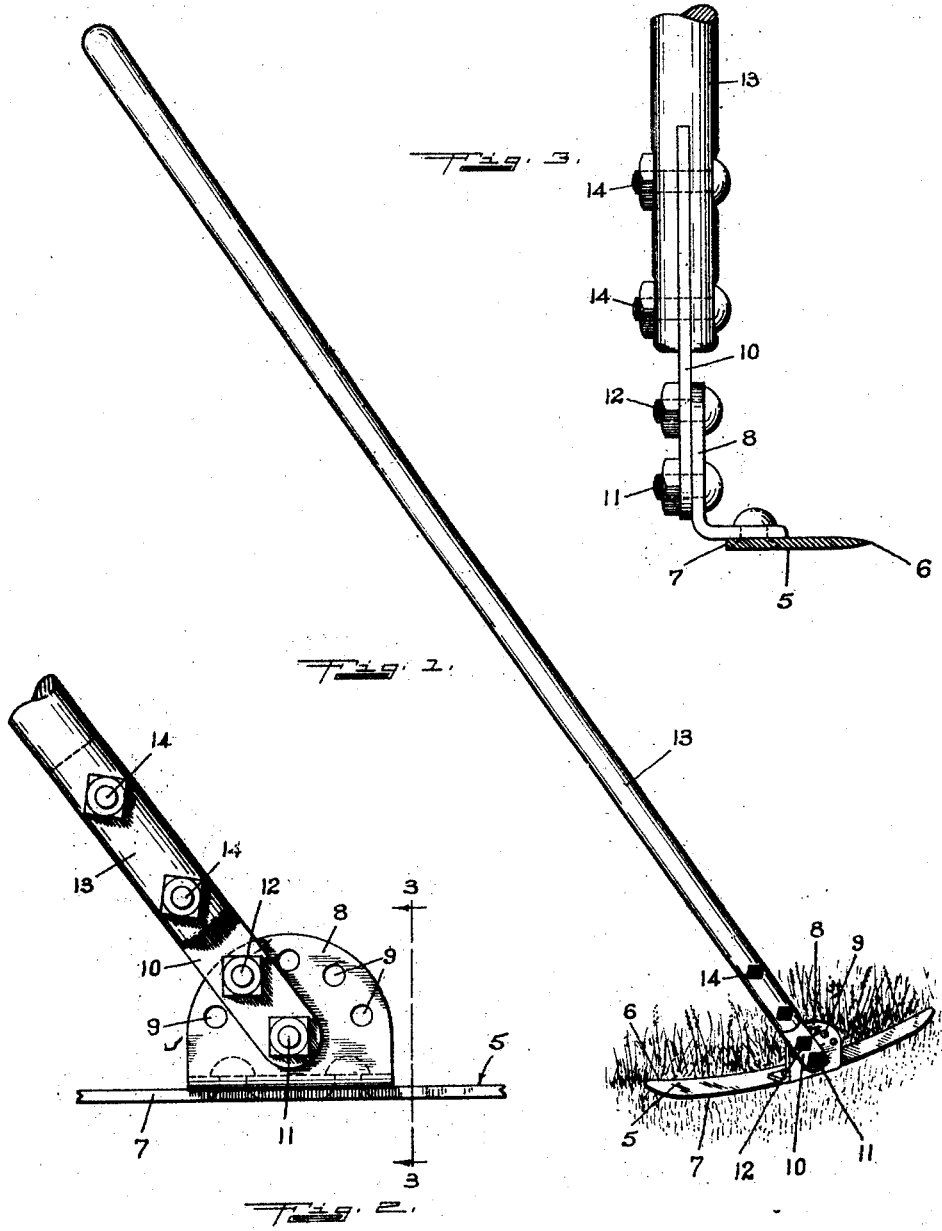

PHILIP J. HAAS, OF OMAHA, NEBRASKA.

GRASS-CUTTER.

1,367,380.　　　　Specification of Letters Patent.　　Patented Feb. 1, 1921.

Application filed September 6, 1918. Serial No. 252,971.

*To all whom it may concern:*

Be it known that I, PHILIP J. HAAS, a citizen of the United States, and a resident of Omaha, in the county of Douglas and State of Nebraska, have invented certain new and useful Improvements in Grass-Cutters, of which the following is a specification.

My invention relates to tools or implements for cutting grass and the like, and it is the object thereof to provide a device particularly adapted for use in place of a hand sickle or light scythe, as for trimming borders, cutting small and medium-sized weeds, cutting grass when the same is too high to be cut satisfactorily with a lawn-mower, trimming grass on terraces or embankments, trimming ornamental hedges, and similar uses. A special object of my invention is to provide an implement for such uses as above enumerated, wherewith the user may stand erect, grasp the handle of the tool with both hands, and by a free swinging motion, without stooping or bending the body, cause the cutting blade to move rapidly, near and substantially parallel with the surface of either level or sloping ground, so as to cut smoothly and evenly any vegetation thereon. A further object of my invention is to arrange the handle and blade so that the resistance of the material cut will be substantially balanced with respect to the axis of the handle and not tend to cause rotation thereof. A further object of my invention is to provide means for adjusting the angular relation of the blade and handle, whereby the tool may be readily adapted for use in different positions, or for either right-handed or left-handed persons.

In the accompanying drawings, Figure 1 is a perspective view of a tool embodying my invention, Fig. 2 is a detail rear view of a portion thereof, and Fig. 3 is a detail side view, the blade being in section on the line 3—3 of Fig. 2.

In the illustrated embodiment of my invention, I provide a flat metal blade 5 which is curved slightly from end to end and sharpened on its front or concave edge 6, the back or convex edge 7 having an additional curvature near the ends to produce a tapering effect thereof, as shown. Adjoining the rear edge of the blade 5, intermediate its ends, a metal angle-plate 8 is secured thereto, said plate having a semi-circular or D-shaped portion which extends vertically when the blade is in a horizontal plane, and the plane of said vertical portion extending longitudinally of the blade. Said vertical portion of the angle-plate has a central bolt-hole therein, and a series of similar holes 9 adjacent to the curved upper edge of the plate and spaced equiangularly about said central hole. A flat bar 10 is secured pivotally to the angle-plate by means of a bolt 11 passing through the central hole in the plate and through a corresponding hole near the rounded end of the bar. A second hole in the bar 10 is adapted to register with any one of the several holes 9, whereby a bolt 12 may be passed through the bar and plate to secure them together in any of the several angular relations determined by the location of said holes 9. A handle 13 is provided and secured to the bar 10 as a prolongation thereof, the lower end of said handle being slotted to receive the bar, which is secured thereto by means of bolts 14 or the like. The handle is preferably made of a light, tough wood, such as hickory, and may be of circular cross-section but tapered slightly, so that the end adjacent to the cutting blade is smaller than the upper end or grip-portion thereof. The length of the handle is such that, when the blade 5 rests upon the ground and the handle extends diagonally upward at an approximate angle of 60°. from the horizontal, the upper end or grip-portion will be at an elevation from the ground such as to be conveniently grasped with both hands by a person of average height, without stooping or bending.

The tool is shown in Fig. 1 as adjusted for use by a right-handed person for cutting vegetation on a level or moderately sloping surface. In the use of the implement as so adjusted, the handle 13 is grasped by the user with both hands, the left hand immediately adjoining the upper end of the handle, and the right hand just below the left, the tool being so held that, when the handle extends diagonally downward and straight ahead of the user, the cutting blade 5 will be parallel with the surface of the ground, and the vertical portion of the angle-plate will be edgewise to the user. While the handle is so gripped, the same is swung so as to carry the head or blade portion back to the right, and then is swung rapidly to the left, toward the vegetation to be cut, being controlled so that the blade will move substantially parallel with the surface of the ground during that portion of its movement in which the cutting is effected. The extent and force of the swing may be readily controlled by the user according to the quantity and toughness of the material to be cut at each stroke. The described manner of use of the implement is such as to cause a minimum of fatigue to the user, and is very closely comparable to the use of a golf club. It will be noted that the principal weight of the implement is at the blade or head thereof, so that its momentum is effectively utilized in doing the work. It will also be noted that, as the handle is connected with the central portion of the blade, symmetrically to the ends thereof, the resistance of the material cut has no tendency to rotate the handle. It will be obvious that, by adjusting the angular relation of the blade and handle, the tool may be readily adapted for use by a left-handed person, or for use on a sloping surface, as of a terrace or embankment, by a person standing either above or below the level at which the cutting is done, or for use in trimming vertically the side of an ornamental hedge or the like. It will be understood, however, that the principal use of the tool will be in the normal adjustment thereof, such as shown in Fig. 1, and that for the more common purposes the handle might be fixedly connected with the blade in substantially the relative position therein shown.

Now, having described my invention, what I claim and desire to secure by Letters Patent is:

1. A two-hand tool adapted for cutting grass and like vegetation and comprising a relatively long flat substantially crescent-shaped blade having a front concave cutting edge and provided adjacent the rear convex edge with a fixed plate extending upwardly perpendicular to the blade, and a light substantially straight handle pivoted to the fixed plate centrally of the blade and angularly adjustable in a plane substantially at right angles to the plane defined by the cutting edge of the blade and in a direction longitudinally of the latter for arranging the handle at an inclination and the blade either in a horizontal position or in inclined position whereby the device is adapted to be operated with both hands with a rapid swinging movement for cutting the grass of a horizontal or inclined surface.

2. A two-hand tool for cutting grass and like vegetation comprising a relatively long flat substantially crescent-shaped blade having a front concave cutting edge and provided adjacent the rear edge with a fixed portion extending upwardly perpendicular to the blade, and a light substantially straight handle secured to the said fixed portion centrally of the blade, in a plane substantially at right angles to the plane defined by the cutting edge of the blade, said handle being arranged at an inclination and extending in a direction longitudinally of the blade whereby the device is adapted to be operated with both hands for rapid swinging movement.

PHILIP J. HAAS.